United States Patent
Lee (10) Patent No.: US 8,046,803 B1
(45) Date of Patent: Oct. 25, 2011

(54) CONTEXTUAL MULTIMEDIA METATAGGING

(75) Inventor: Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 387 days.

(21) Appl. No.: 11/617,707

(22) Filed: Dec. 28, 2006

(51) Int. Cl.
H04N 5/445 (2011.01)

(52) U.S. Cl. ............................... 725/60; 725/32; 725/34

(58) Field of Classification Search .............. 725/32–36, 725/60–61, 46
See application file for complete search history.

(56) References Cited

U.S. PATENT DOCUMENTS

| | | | |
|---|---|---|---|
| 5,038,211 A | 8/1991 | Hallenbeck | |
| 5,721,827 A | 2/1998 | Logan et al. | |
| 5,732,216 A | 3/1998 | Logan et al. | |
| 5,774,170 A | 6/1998 | Hite et al. | |
| 5,892,536 A | 4/1999 | Logan et al. | |
| 5,892,554 A | 4/1999 | DiCicco et al. | |
| 5,926,624 A | 7/1999 | Katz et al. | |
| 6,006,257 A | 12/1999 | Slezak | |
| 6,055,566 A | 4/2000 | Kikinis | |
| 6,282,713 B1 | 8/2001 | Kitsukawa et al. | |
| 6,351,736 B1 | 2/2002 | Weisberg et al. | |
| 6,463,468 B1 | 10/2002 | Buch et al. | |
| 6,553,222 B1 | 4/2003 | Weiss | |
| 6,578,070 B1 | 6/2003 | Weaver et al. | |
| 6,615,408 B1* | 9/2003 | Kaiser et al. | 725/112 |
| 6,698,020 B1 | 2/2004 | Zigmond et al. | |
| 6,795,702 B2 | 9/2004 | Sennett | |
| 7,051,357 B2 | 5/2006 | Carr | |
| 7,134,132 B1 | 11/2006 | Ngo et al. | |
| 7,206,748 B1 | 4/2007 | Gruse et al. | |
| 7,412,484 B1 | 8/2008 | Kikinis | |
| 7,444,659 B2 | 10/2008 | Lemmons | |
| 7,509,178 B2 | 3/2009 | Logan et al. | |
| 7,568,213 B2 | 7/2009 | Carhart et al. | |
| 7,624,337 B2 | 11/2009 | Sull et al. | |
| 7,779,438 B2 | 8/2010 | Davies | |
| 2001/0001159 A1 | 5/2001 | Ford | |
| 2002/0083445 A1* | 6/2002 | Flickinger et al. | 725/35 |
| 2002/0087402 A1 | 7/2002 | Zustak et al. | |
| 2002/0100045 A1* | 7/2002 | Rafey et al. | 725/46 |
| 2002/0120925 A1 | 8/2002 | Logan | |
| 2002/0131511 A1 | 9/2002 | Zenoni | |
| 2002/0144262 A1 | 10/2002 | Plotnick et al. | |
| 2002/0169540 A1 | 11/2002 | Engstrom | |
| 2003/0001846 A1 | 1/2003 | Davis et al. | |
| 2003/0011477 A1 | 1/2003 | Clapper | |
| 2003/0070182 A1* | 4/2003 | Pierre et al. | 725/135 |
| 2003/0073411 A1 | 4/2003 | Meade, II | |

(Continued)

OTHER PUBLICATIONS

Lee, Wing K., "System and Method for Identifying and Managing Social Circles," filed Dec. 28, 2006 U.S. Appl. No. 11/617,709.

(Continued)

*Primary Examiner* — Pankaj Kumar
*Assistant Examiner* — Timothy Newlin (57) ABSTRACT

A multimedia distribution system is provided that includes a multimedia distributor and a customer device. The multimedia distributor is in communication with a multimedia producer. The multimedia producer produces multimedia content. The multimedia distributor encodes the multimedia content with a metatag. The customer device is in communication with the multimedia distributor and is configured to present the multimedia content to a customer and provide the customer with a plurality of options for the customer to obtain additional information about a subject of the metatag. The multimedia distributor encodes the multimedia content with the metatag based on information about the customer.

19 Claims, 5 Drawing Sheets

U.S. PATENT DOCUMENTS

| | | | |
|---|---|---|---|
| 2003/0093790 | A1 | 5/2003 | Logan et al. |
| 2003/0093794 | A1 | 5/2003 | Thomas et al. |
| 2003/0110130 | A1 | 6/2003 | Pelletier |
| 2003/0126597 | A1 | 7/2003 | Darby et al. |
| 2003/0135853 | A1* | 7/2003 | Goldman et al. ............... 725/34 |
| 2003/0163815 | A1 | 8/2003 | Begeja et al. |
| 2003/0226142 | A1* | 12/2003 | Rand ............................. 725/32 |
| 2004/0006767 | A1 | 1/2004 | Robson et al. |
| 2004/0034874 | A1 | 2/2004 | Hord et al. |
| 2004/0073915 | A1 | 4/2004 | Dureau |
| 2005/0009525 | A1 | 1/2005 | Evslin |
| 2005/0120391 | A1* | 6/2005 | Haynie et al. ................. 725/135 |
| 2006/0015409 | A1 | 1/2006 | Kato et al. |
| 2006/0092966 | A1 | 5/2006 | Sitnik et al. |
| 2006/0126556 | A1 | 6/2006 | Jiang et al. |
| 2006/0168630 | A1 | 7/2006 | Davies |
| 2006/0218577 | A1* | 9/2006 | Goodman et al. .............. 725/32 |
| 2006/0259930 | A1* | 11/2006 | Rothschild ...................... 725/81 |
| 2006/0265657 | A1 | 11/2006 | Gilley |
| 2007/0135087 | A1 | 6/2007 | Villevieille et al. |
| 2007/0157247 | A1 | 7/2007 | Cordray et al. |
| 2007/0186228 | A1 | 8/2007 | Ramaswamy et al. |
| 2007/0204310 | A1 | 8/2007 | Hua et al. |
| 2007/0214476 | A1 | 9/2007 | Zalewski et al. |
| 2007/0226761 | A1 | 9/2007 | Zalewski et al. |
| 2007/0250901 | A1 | 10/2007 | McIntire et al. |
| 2007/0294773 | A1 | 12/2007 | Hydrie et al. |
| 2008/0009268 | A1 | 1/2008 | Ramer et al. |
| 2008/0040768 | A1* | 2/2008 | Robotham .................... 725/132 |
| 2008/0109843 | A1 | 5/2008 | Ullah |
| 2008/0148320 | A1 | 6/2008 | Howcroft |
| 2008/0153413 | A1 | 6/2008 | Li et al. |
| 2008/0189736 | A1 | 8/2008 | Edwards et al. |
| 2008/0256572 | A1 | 10/2008 | Chen |
| 2008/0276270 | A1 | 11/2008 | Kotaru et al. |
| 2008/0304805 | A1 | 12/2008 | Baharav et al. |
| 2008/0319828 | A1 | 12/2008 | Southam et al. |
| 2009/0171787 | A1 | 7/2009 | Mei et al. |
| 2009/0210898 | A1 | 8/2009 | Childress et al. |

OTHER PUBLICATIONS

Izdepski, Erich, et al., "Multimedia Broadcast Discovery and Delivery," filed Sep. 26, 2006, U.S. Appl. No. 11/527,929.

Izdepski, Erich, et al., "Dual Channel and Communication in Fusion (Phone/Cable)," U.S. Appl. No. 12/107,762, filed Apr. 22, 2008.

Zhu, Kevin, "Multimedia Product Placement Marketplace," U.S. Appl. No. 12/606,276, filed Oct. 27, 2009.

Delker, Jason R., et al.., "Video Content Tagging System and Method," filed Oct. 13, 2006, U.S. Appl. No. 11/580,719.

Gailloux, et al.., "Enabling Communication Between End Points of Different Networks," filed Aug. 23, 2006, U.S. Appl. No. 11/466,558.

Gailloux, et al.., "Personalized Television," filed Aug. 26, 2006, U.S. Appl. No. 11/466,643.

Federal Communications Commission, 47 C.F.R. 73.682(a), Oct. 1, 2003.

Advanced Television Systems Committee, "ATSC Recommended Practice: Program and System Information Protocol Implementation Guidelines for Broadcasters", Doc. A169, Jun. 25, 2002.

M. Nilsson, "ID3 Tag Version 2.4.0—Native Frames", Nov. 1, 2000, http://www.id3.org/id3v2.4.0-frames.txt.

M. Nilsson, "ID3 Tag Version 2.4.0—Main Structure", Nov. 1, 2000, http://www.id3.org/id3v2.4.0-structure.txt.

Office Action dated Feb. 20, 2009, U.S. Appl. No. 11/466,643.

Final Office Action dated Sep. 1, 2009, U.S. Appl. No. 11/466,643.

Advisory Action dated Dec. 1, 2009, U.S. Appl. No. 11/466,643.

Office Action dated Feb. 2, 2010, U.S. Appl. No. 11/466,643, 31 pages.

Office Action dated Dec. 29, 2008, U.S. Appl. No. 11/580,719, 29 pages.

Office Action dated Jul. 7, 2009, U.S. Appl. No. 11/580,719, 25 pages.

Notice of Abandonment dated Feb. 1, 2010, U.S. Appl. No. 11/580,719, 2 pages.

Office Action dated Apr. 29, 2009, U.S. Appl. No. 11/466,558, 14 pages.

Final Office Action dated Nov. 3, 2009, U.S. Appl. No. 11/466,558, 19 pages.

Office Action dated Mar. 5, 2010, U.S. Appl. No. 11/466,558, 21 pages.

Delker, Jason R., et al., "Method for Providing Personalized, Targeted Advertisements During Playback of Media," U.S. Appl. No. 11/850,029, filed Sep. 4, 2007.

Office Action dated Aug. 4, 2010, U.S. Appl. No. 11/850,029, filed Sep. 4, 2007, 11 pages.

Office Action to Restriction dated Jan. 11, 2011, U.S. Appl. No. 11/850,029, filed Sep. 4, 2007.

Delker, Jason R., et al., "Method and System for Selecting Advertisements to Display on a Television," U.S. Appl. No. 12/110,277, filed Apr. 25, 2008.

Delker, Jason R., et al., "Media Insertion Points," U.S. Appl. No. 12/243,735, filed Oct. 1, 2008.

Final Office Action dated Mar. 14, 2011, U.S. Appl. No. 12/107,762, filed Apr. 22, 2008.

Office Action dated Sep. 28, 2010, U.S. Appl. No. 12/110,277, filed Apr. 25, 2008.

Office Action dated Dec. 27, 2010, U.S. Appl. No. 12/243,735, filed Oct. 1, 2008.

Office Action dated Oct. 22, 2010, U.S. Appl. No. 12/107,762, filed Apr. 22, 2008.

Final Office Action dated Apr. 28, 2011, U.S. Appl. No. 11/850,029, filed on Sep. 4, 2007.

Final Office Action dated Apr. 13, 2011, U.S. Appl. No. 12/110,277, filed on Apr. 25, 2008.

Advisory Action dated Jun. 8, 2011, U.S. Appl. No. 12/110,277, filed on Apr. 25, 2008.

Final Office Action dated May 16, 2011, U.S. Appl. No. 12/243,735, filed on Oct. 1, 2008.

* cited by examiner

CONTEXTUAL MULTIMEDIA METATAGGING

CROSS-REFERENCE TO RELATED APPLICATIONS

This application contains subject matter related to U.S. patent application Ser. No. 11/527,929, entitled "Multimedia Broadcast Discovery and Delivery", inventors Erich Izdepski et al., filed Sep. 26, 2006, which incorporated herein by reference for all purposes

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising has been an integral part of multimedia content from radio and television broadcasts to movies. Advertising has been implemented in many forms with multimedia content, including a single sponsor paying for large blocks of advertising time before and after multimedia presentations or selling short advertisement times to multiple sponsors throughout a multimedia presentation. Another less invasive method of advertising is through product placement. Product placement is the use of real commercial products by characters in multimedia content. For example, a character may use a commercially available cell phone in the midst of a television show. The use of product placement in multimedia content is presented in such a way as to evoke a response from a potential customer that may be associated with the product in order to encourage the purchase of the product.

With the advent of digital video recorders (DVRs) customers now have a new level of control over their viewing experience. DVRs may be used to record multimedia content and give a user control over how the content is played back or presented through controls such as pause, rewind, and fast forward. The increased control gained by using a DVR has enabled viewers to fast forward past advertisements. However, it has been found that some viewers actually rewind to watch or re-watch commercials that are of particular interest to them.

Through monitoring how users control their viewing experience on DVRs, it can be seen that viewers are not opposed to commercials in their entirety, but would prefer to only view advertisements that are of particular interest to them. Further, advertisements to date have typically been static presentations of commercials or product placements with little or no way for a potential customer to interact with a product and act on the emotional or other appeal associated with the presentation of the product.

SUMMARY

In one embodiment, a multimedia distribution system is provided that includes a multimedia distributor and a customer device. The multimedia distributor is in communication with a multimedia producer. The multimedia producer produces multimedia content. The multimedia distributor encodes the multimedia content with a metatag. The customer device is in communication with the multimedia distributor and is configured to present the multimedia content to a customer and provide the customer with a plurality of options for the customer to obtain additional information about a subject of the metatag. The multimedia distributor encodes the multimedia content with the metatag based on information about the customer.

In another embodiment, a method for metataging multimedia content is provided. The method includes inserting at least one metatag into multimedia content. The metatag corresponds to at least one item of interest that coincides with the content in the video or audio stream. The method includes indicating the presence of the metatag, and selecting one of a plurality of options including: an option to provide information about the at least one item of interest, providing an option to interact with the at least one item of interest, and an option to enable a transaction with the at least one item of interest.

In still another embodiment, a method of providing multimedia content with metatags is provided. The method includes obtaining multimedia content, and determining a first customer information. The method includes inserting a first metatag into the multimedia content to promote materials including at least one of products and services. The first metatag is inserted in the multimedia content based on the first customer information. The method further includes providing the multimedia content to the first customer. The method includes determining a second customer information, and inserting a second metatag into the multimedia content to promote materials including at least one of products and services. The second metatag is inserted in the multimedia content based on the second customer information. In some embodiments, the first and second metatags may promote different materials. The method includes providing the multimedia content to the second customer.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method of inserting and using metatags in multimedia distributions. The insertion and use of a metatag may be customized for each customer based on various factors including details of the multimedia content, products or other items of interest featured during a period for responding to the multimedia content, customer data such as user profiles, customer location, and other information. The metatag may be used to personalize the experience of multimedia viewing by providing options where the viewer may obtain more information, interact with, or enable a transaction with a product or other item of interest in the multimedia content. The insertion of a metatag may be used as a personalized substitute for or in addition to commercials or other advertisements in the multimedia content.

In one embodiment, the present disclosure provides a system where a media distributor, such as a cable television provider, wire line and wireless telecommunication providers, or any other content distributor using the Internet or other public or private networks, may dynamically change or add metatags or metatag information to a media stream being provided to the media distributor's customer or viewer. The media distributor may use known information, such as a customer profile or preference, to customize the metatag for the customer or viewer.

In some embodiments, the media distributor may employ social circles when creating, updating, or distributing the metatags. In other embodiments, the metatags might be activated, highlighted, or otherwise denoted to attract the user's attention differently based on the user's profile or information gleaned based on information related to the user's social circle. The user's social circle includes, but is not limited to, the set of contacts with whom the user communicates via the connected device. The social circle might originally be specified by the user and might later be automatically modified by the telecommunications provider based on the user's actual usage patterns. Alternatively, the social circle might be entirely inferred by the telecommunications provider or might first be inferred by the telecommunications provider and then modified by the user.

The usage patterns might be based on the persons whom the user calls, the persons to whom the user sends Short Message Service (SMS) messages, the persons to whom the user sends pager messages, the persons to whom the user sends instant messages, and the persons with whom the user communicates via two-way radio. The social circle might include references to the degrees of separation of the user from the contacts. For example, contacts with whom the user regularly communicates might be considered to have one degree of separation from the user. Persons with whom those contacts communicate but who do not communicate with the user might be considered to have two degrees of separation from the user, and so on. Further information related to social circles can be found in U.S. patent application Ser. No. 11/617,709, entitled "System and Method for Identifying and Managing Social Circles", filed on Dec. 28, 2006, Wing K. Lee inventor, which is incorporated herein by reference for all purposes. Further, the metatags may be created or updated in advance or generated real-time based on, for example, user profile and preferences and then added to the multimedia as it is streaming to the customer or viewer.

Figure 1:
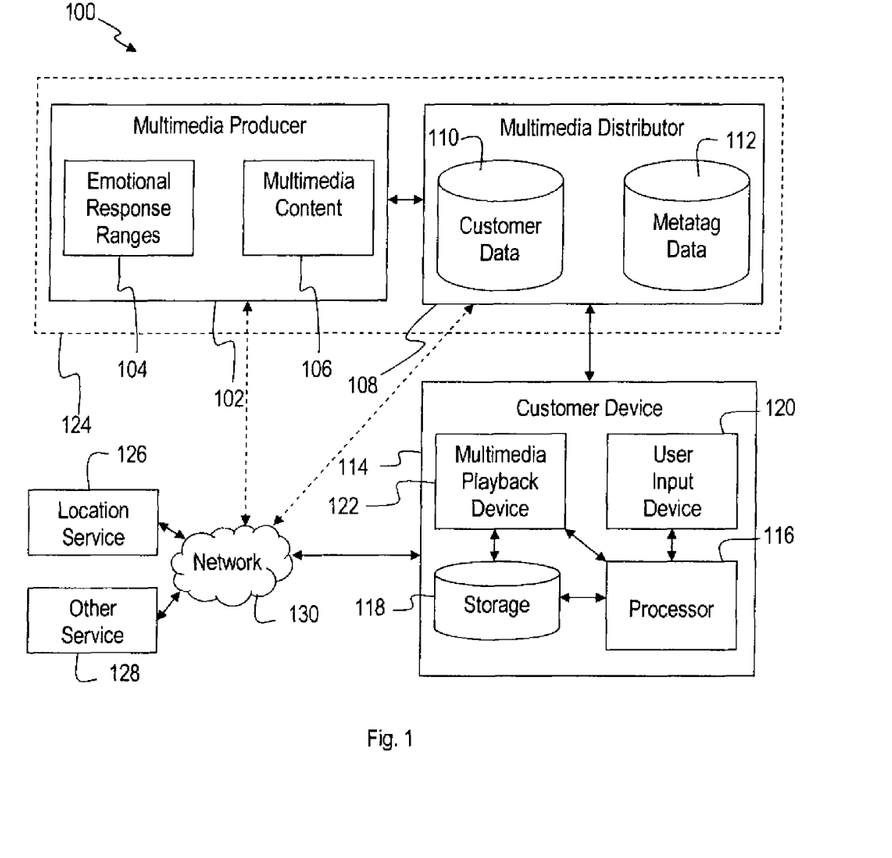
FIG. 1 illustrates an exemplary multimedia metatagging system.

According to one embodiment, the insertion of metadata tags (metatags) into a multimedia distribution may be used to personalize a generic television broadcast or any other multimedia content distributed to a large audience. FIG. 1 illustrates an exemplary multimedia metatagging system 100 for inserting personalized metatags into multimedia content distribution. As shown in FIG. 1, the multimedia metatagging system 100 includes a multimedia producer 102, a multimedia distributor 108, and a customer device 114, each described in more detail below. While a single multimedia producer 102 and a single customer device 114 are shown, one skilled in the art will recognize that there may be a plurality of each. Also, while the multimedia producer 102 and the multimedia distributor 108 are illustrated as separate, in some embodiments they may be integrated together as shown by the dashed line 124.

The multimedia producer 102 of the multimedia metatagging system 100 includes multimedia content 106 and an indication of response ranges 104 for the multimedia content 106. The indication of response ranges 104 may indicate a period of time during which a customer may have an response to the multimedia content 106. For example, the indication of response ranges 104 may include periods of time that are sentimental, suspenseful, or action packed, such as during a car chase scene. The periods of time may be indicated in any manner, such as through an indication of a start time and a duration, a start time and an end time, a range of frame numbers, or any other indication of a period of time in the multimedia content 106 that would be recognized by one skilled in the art. The start and end times described above may be time stamps relative to the start of the multimedia content 106, the end of the multimedia content 106, or relative to any other intermediate position of the multimedia content 106, such as relative to a chapter within the multimedia content 106. While described above as response ranges 104, the periods of time indicated may include any time in which a product or other item of interest is featured in the multimedia content 106. The product may include any commercially available product or service. The other item of interest may include any of an actor, a location, landmarks, or any other item that may be of interest that is featured in the multimedia content 106.

The indication of an response range 104 may also include a list of products that are featured during the response range 104. In the car chase scene example used above, the list of products may include the car used in the car chase scene, the tires on the car, the apparel worn by the driver of the car, and any other products that may be associated with the emotional appeal provided by the car chase scene. The list of products may be used by the multimedia distributor 108 or a customer using the customer device 114 as described in more detail below.

The multimedia content 106 may take any form. For example, video content may include television shows, commercials, movies, online games, or any other form of video. The multimedia content 106 may also include audio content such as radio broadcasts. In some embodiments, the present disclosure may include Personal Area Networks such as RFID or Near Field Communication (NFC) for interacting with metadata information distributed in a radio broadcast using a handheld device in communication with the radio. One skilled in the art will recognize that any other form of multimedia content may be used in accordance with the embodiments described herein.

The multimedia producer 102 may communicate the multimedia content 106 along with the indication of response ranges 104 to the multimedia distributor 108. The multimedia distributor 108 may dynamically select and insert one or more metatags 112 into the multimedia content 106 for distribution to a customer in accordance with customer data 110. The metatags 112 may be used to personalize the multimedia playback experience as described in more detail below. The selection of a metatag 112 may be done using customer behavior analytics on the customer data 110 to correlate the metatag 112 with an response range 104. The metatag 112 may be inserted into the multimedia content 106 in accordance with any standard appropriate for the multimedia content 106. For example, the metatag 112 may be inserted into video in accordance with the Advanced Television Enhancement Forum (ATVEF) standard.

The customer data 110 may include user profiles that indicate various user preferences and demographic data. The demographic data may include information such as a home location, age, sex, or any other demographic data that may be useful for selecting and inserting metatags 112 that may be of particular interest to a customer. The user preferences may include various user interests, preferences of particular brands, or any other preference data that may be useful for selecting and inserting metatags 112. The user profiles may be adaptive in accordance with viewing patterns, prior selections of metatags 112, or any other historical or usage data that may be useful for selecting and inserting metatags 112.

The customer data 110 may also include data collected from the customer device 114 at the time of distribution of the multimedia content 106. Information that may be collected from the customer device 114 may include an identification of a user, locally stored user profiles, current location information, current user selections, or any other information that may be stored or selected from the customer device 114. In one embodiment, the customer data 110 is only stored on the customer device 114 and supplied to the multimedia distributor 108 in response to requests for customer data 110 initiated by the multimedia distributor 108. The metatags 112 include data that may be used to provide additional information for a product, interact with a product, and/or enable a transaction with a product as will be described in more detail below.

In one embodiment, the multimedia distributor 108 may only receive the multimedia content 106 from the multimedia producer 102. In this case, the multimedia distributor 108 may examine the multimedia content 106 in order to determine the indication of response ranges 104 and the products or other item of interest used during the determined ranges.

The multimedia distributor 108 acts as an intermediary between the multimedia producer 102 and the customer device 114. The multimedia distributor 108 may encode, encrypt, or otherwise manipulate the multimedia content 106 such that it is in a suitable form for distribution. For example, the multimedia distributor 108 may encode multimedia content 106 in accordance with the H.264 video codec standard or any other video, image, or audio codec standard. The metatags 112 may be inserted in the multimedia content 106 during this encoding process. The multimedia distributor 108 may then distribute the encoded multimedia content 106 to the customer device 114 using wired and/or wireless communication links.

The multimedia distributor 108 may distribute the multimedia content 106 using any distribution techniques known to those skilled in the art. The multimedia distributor 108 may act as a broadcaster or interactive distributor of the multimedia content 106 to the customer device 114. The multimedia distributor 108 may be implemented as a cable head-end, a telecommunications central office, or any other information distribution hub in a private or public network, such as the Internet, that communicates with customer devices 114. For broadcast distribution, the same multimedia content 106 is distributed to a plurality of customer devices in a particular area or region. For interactive distribution, a customer may initiate distribution upon the multimedia distributor 108 receiving requests for specific multimedia content 106 from customer devices 114. In this case, the multimedia content 106 may be distributed to the requesting customer device 114 for immediate play back, distributed and stored on the customer device 114 for subsequent play back, or scheduled for distribution at a later time, for example. When the multimedia content 106 is stored on the customer device 114 for subsequent playback, any metatags 112 distributed along with the multimedia content 106 may also be stored on the customer device 114 for use when the multimedia content 106 is played back. In one embodiment, the multimedia content 106 alone may be stored on the customer device 114, and upon initiating playback or during the playback, the customer device 114 may request current metatags 112 from the multimedia distributor 108.

The multimedia content 106 may also be distributed on a physical medium such as a DVD, CD, or any other physical medium. The multimedia content 106 may have the response ranges 104 recorded with it on the physical medium, however, the metatags 112 may not be recorded on the physical medium. In this case, the customer device 114 implementing the playback of the multimedia content 106 on the physical medium, may request metatags 112 from the multimedia distributor 108 to be dynamically inserted during playback upon reaching an response range 104. In this way, the metatags 112 may remain current and correspond with the preferences of each user that plays back the multimedia content on the physical medium. In one embodiment, the metatags 112 may be recorded on the physical medium along with the response ranges 104 and the multimedia content 106. It is contemplated that the multimedia content 106 may include video, audio, video game, or any other multimedia content.

The functions of the multimedia distributor 108 described above may be implemented using a general purpose computer. A discussion of general purpose computers is detailed below. Alternatively, the multimedia distributor 108 may implement the functions described above under the control of one or more application specific integrated circuits, or both.

If the customer device 114 has a direct communication link with the multimedia distributor 108, then the metatags 112 may be inserted for that individual customer device 114. When the multimedia content 106 is broadcast or otherwise distributed to multiple customer devices 114 at the same time then metatags 112 corresponding to a plurality of the customer devices 114 may be inserted into the multimedia content 106. In this case, the metatags 112 for a particular customer device 114 may need to be filtered, selected, or otherwise provided to the corresponding customer device 114. This may be accomplished by including with the metatags 112 an indication that identifies each customer device 114 that the metatags 112 are to be provided to or accessed by. Alternatively, the multimedia distributor 108 may inserts all possible metatags 112 for a particular portion of the multimedia content 106 and each customer device 114 may then filter or select which metatags 112 to use in accordance with user profile data or location data as disclosed in more detail below. In another alternative, the metatags 112 to be used by a customer device 114 may be provided as protected content that may be unlocked for use by the customer device 114 in accordance with the related disclosure entitled "Multimedia Broadcast Discovery and Delivery", to Erich Izdepski et al., filed Sep. 26, 2006, which was incorporated herein by reference above.

The customer device 114 of the multimedia metatagging system 100 includes a processor 116, a storage 118, a user input device 120, and a multimedia playback device 122. The customer device 114 may be implemented as a portable telecommunications device, such as a cellular telephone, or as any other handheld device, such as a personal digital assistant (PDA), or other media players. The customer device 114 may also be implemented as a set top box, television, gaming console, or any other stationary device in communication with the multimedia distributor 108. The customer device 114 may also be implemented as a radio, such as a satellite radio device. In the case of radio, the metatags 112 may be sent to a device in communication with the radio and configured to receive and utilize the metatags 112 included in a radio broadcast as mentioned above. The customer device 114 may also be an in-car video or other consumer electronic device having media player capabilities.

The processor 116 controls the operation and communication of the customer device 114. For example, the processor 116 may interpret user inputs from the user input device 120 to communicate a request for multimedia content 106 from the multimedia distributor 108. Upon receiving the multimedia content 106, the processor 116 may buffer the multimedia content 106 in the storage 118 for subsequent playback on the multimedia playback device 122. The processor 116 may be implemented as one or more application specific integrated circuits or the customer device 114 may be implemented as a general purpose computer described in detail below.

The storage 118 may be used for storing a variety of data that may be used by the customer device 114 and the multimedia distributor 108. For example, the storage 118 may store user information, local user profiles, current user selections, and other such information that may be communicated and used by the multimedia distributor 108. The storage 118 may also store instructions that may be executed by the processor 116 for implementing the control of the customer device 114. The storage 118 may also store graphical user interface (GUI) icons, images, screens, and workflows that may be displayed as a GUI under the control of the processor 116 when the multimedia playback device 122 is a display. Such a GUI provides visual feedback to a user for enabling control of the operations of the customer device 114 using the user input device 120.

The customer device 114 may be in communication with a network 130. The network 130 may include any one or a combination of a local area network, a personal area network, a wide area network, the internet, or any other network. Also in communication with the network are several services, including a location service 126 and another service 128. The location service 126 may, for example, be used by the customer device 114 in order to determine a current geographic location of the user device 114. In one embodiment the functionality provided by the location service 126 and/or the other service 128 may be provided locally on the customer device 114. In one embodiment, the multimedia producer 102 and the multimedia distributor 108 may be in communication with the network 130 as indicated by the dashed lines. In this embodiment, the distribution of the multimedia content 106 may be made through the network 130.

In operation, the multimedia distributor 108 delivers the multimedia content 106 with the inserted metatags 112 to the customer device 114 for playback. As noted above, the metatags 112 may be inserted at any point in the multimedia content 106. The metatags 112 are preferably placed in the multimedia content 106 at a point that evokes an emotional or other response. Upon the playback of the multimedia content 106 reaching the point where the metatags 112 have been inserted, an indication of the presence of metatags 112 may be presented by the customer device 114.

Figure 2:
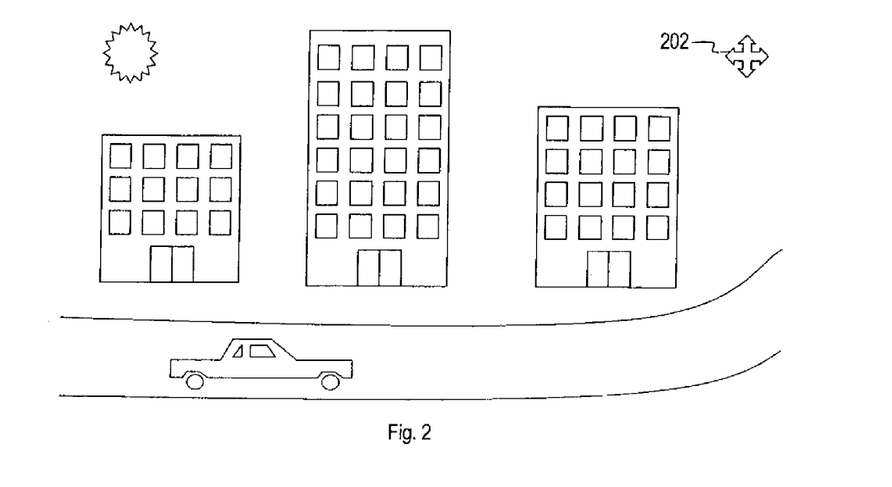
FIG. 2 illustrates an exemplary video playback with an indication of a metatag.

FIG. 2 illustrates an exemplary playback of video multimedia content 106 on the multimedia playback device 122. As shown in FIG. 2 a video scene of a car driving through a city is shown. This particular scene of the car may have been selected and indicated in the response ranges 104 due to an expected response from a viewer of the video multimedia content 106 of the profile view of the car driving. As shown by the navigation icon 202 in the corner of the video playback, metatags 112 are available for use by the viewer. While illustrated as being placed in the corner of video playback, the icon 202 may be placed anywhere within the video frame in order to unobtrusively indicate that metatags 112 are available. In order to access the metatags 112, the viewer may provide inputs, such as pressing a selection button on the user input device 120. In one embodiment, the viewer may select an option to access the metatags 112 at a later point. In this case, at a time desired by the viewer, the metatags 112 may be accessed by manipulating the user input device 120.

Figure 3:
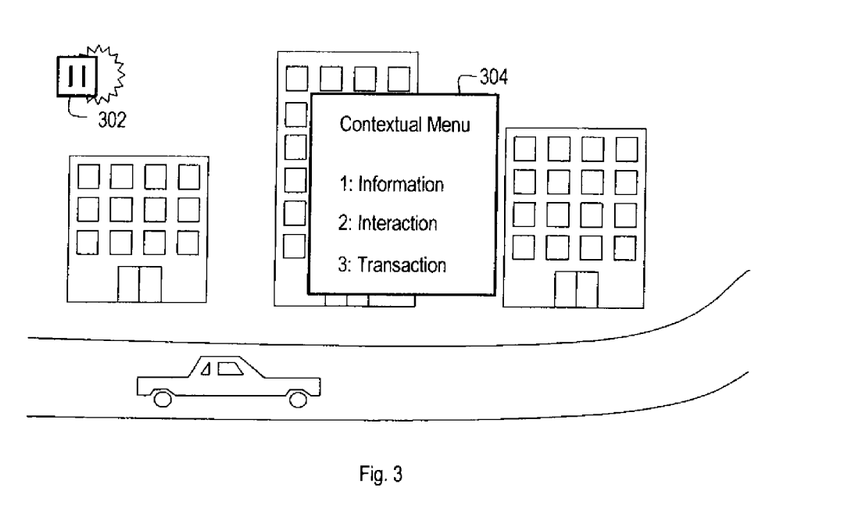
FIG. 3 illustrates an exemplary contextual menu displayed in response to acting on the indication of a metatag.

FIG. 3 illustrates how the video scene of FIG. 2 is updated upon a user acting on the indication of a metatag 112. As shown by icon 302, the video scene has been paused and a contextual menu 304 is overlaid on top of the video scene. In one embodiment, the current frame is simply held statically displayed with icon 302 indicating that the video scene has been paused. The contextual menu 304 has three options corresponding to the metatag 112 of a product or other item of interest being shown or described in the multimedia content 106. The options include an option for requesting more information about the product or other item of interest, an option for interacting with the product or other item of interest, and an option for engaging in a transaction with the product or other item of interest. In the case of the video scene illustrated in FIGS. 2 and 3, the information option in the contextual menu 304 may be to view a brochure about the car, the interaction option may be to schedule a test drive of the car, and the transaction option may be to request quotes from three dealers nearest to the user's location. Other information options may include a uniform resource locator (URL) link to a website for the car, the phone number of a dealer, or an option to view a commercial about the car, for example. Other transaction options may include purchasing merchandizing related to the car, such as a hat with a decal of the car or car manufacturer logo on it, for example. One skilled in the art will recognize that the options of information, interaction, and transaction, on the contextual menu 304 may be readily modified according to the product or other item of interest they are describing.

Multiple sub-options may be supplied for each of the three categories of options on the contextual menu 304. For example, a user may select the first option on the contextual menu 304 for requesting more information about the product. The contextual menu 304 or another menu may then be populated with the various information options available. The additional options may be filtered in accordance with user preferences or user profile data.

As mentioned above, several products may be featured during a response range 104 with a product list being provided with the response range 104 to be associated with the metatags 112. The product list may be displayed in response to a user acting on an indication of the metatags 112, such as the icon 202. The product list may include a product name and optionally provide a brief description of each product on the product list. It is contemplated that the product list may be grouped into categories based on the types of products featured, such as a category for apparel. From the product list a user may select one of the products featured in the current response range 104 of the multimedia content. In response to the selection of a product, the contextual menu 304 may display the three options for further selection by the user as described above. In some embodiments, this information may be provided similar to that of a browser where the user may select the content from an active web site.

Figure 4:
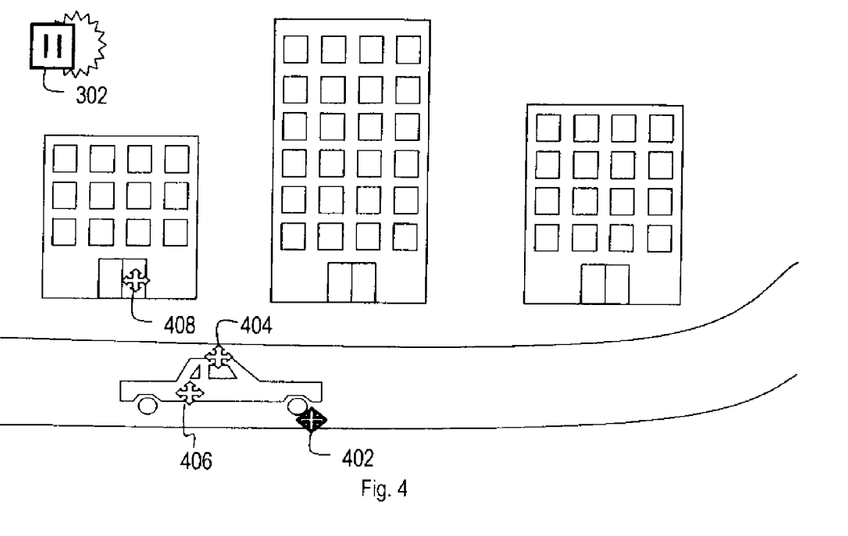
FIG. 4 illustrates an exemplary product selection.

FIG. 4 illustrates an alternative embodiment for identifying several products featured during the response range 104. In response to a user acting on an indication of the metatags 112, such as the icon 202, the playback of the multimedia content 106 may be stopped or paused as indicated by icon 302. Each product featured during the response range 104 may have an icon similar to icon 202 that indicates metatags 112 are available for that product. As shown in the embodiment of FIG. 4, some featured products may include the tires of the car as indicated by icon 402, the car itself as indicated by icon 404, and the paint job on the car as indicated by icon 406. Other products unrelated to the current scene in the video playback may also be featured, such as the doors on the building behind the car as indicated by icon 408. Unrelated products may be differentiated through having a different color icon, an icon of a different design, or otherwise differentiating the appearance of the icon.

A user may navigate between each of the featured products using the user input device 120 to select one of the featured products. As shown with icon 402, the currently selected icon may be indicated by adding a highlight or otherwise altering the appearance of the icon. Upon navigating to another icon the name of the featured product, and optionally, a brief description of the featured product may be displayed. In response to the selection of a product, the contextual menu 304 may display the three options for further selection by the user as described above.

In one embodiment, the product indications or product list may be displayed whenever the multimedia playback is stopped or paused without an indication of a metatag 112. This may be useful, for example, in cases where products are featured throughout a majority of the multimedia playback and the indication of metatags 112 would be distracting to the multimedia playback. For example, if a video playback features products in all or a significant number of the frames in the video playback, then the indication of the metatags 112, such as icon 202 shown in FIG. 2, may be displayed for long periods of time and distract from the video playback. In one embodiment, the indication of metatags 112 may be made on a device in communication with the customer device 114. For example, rather than displaying an icon in the corner of a television video playback, an indication light or icon displayed on a remote control may indicate that metatags 112 are available. In other embodiments the metatags 112 may be a text string providing instructions or other indicia selectable by the user, or otherwise able to provide additional information to the user.

Figure 5:
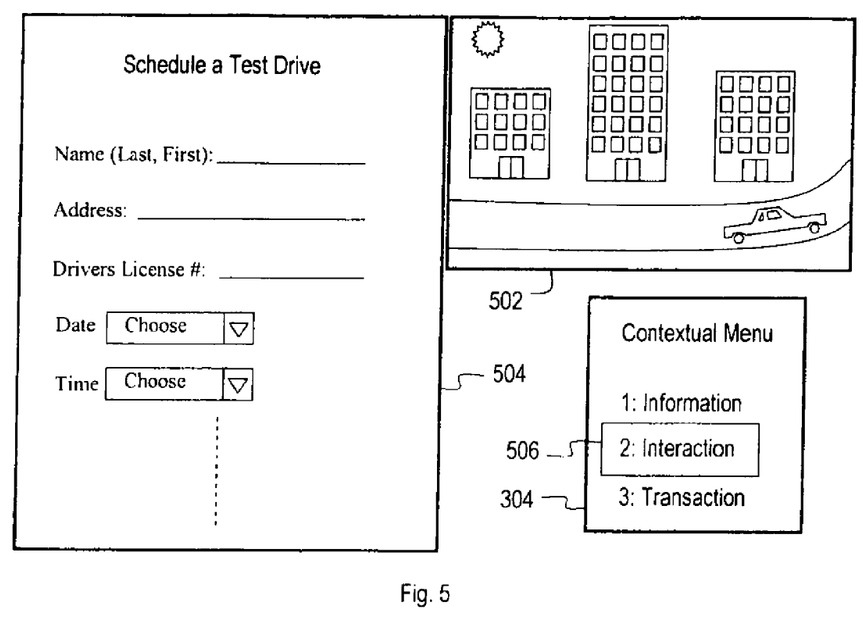
FIG. 5 illustrates an exemplary display of data corresponding to a metatag.

FIG. 5 illustrates how the video scene of FIG. 3 is updated upon a user selecting one of the options in the contextual menu 304. As shown in FIG. 5, the screen includes a scaled window 502 for displaying the video scene, a window 504 for providing data corresponding to the metatags 112 in accordance with the selection of an option in the contextual menu 304, and the contextual menu 304 with an indication 506 of the currently selected option. The video scene may continue playback in window 502 or may remain paused in window 502 similar to FIG. 3. As shown in FIG. 5, the interaction option has been selected on the contextual menu 304. As mentioned above, the interaction option may be to schedule a test drive of the car, in which case the window 504 is populated with a form for scheduling the test drive. If the user subsequently selects another option on the contextual window, then the window 504 may be repopulated in accordance with the latest user selection. For example, the window 504 may be populated with a brochure of the car, with a website navigated to by the customer device 114, or with any other information corresponding to the user selection on the contextual menu 304. In other embodiments where VoIP (Voice over Internet Protocol) is being employed, the user may select to speak directly with a customer service representative to, for example, schedule the test drive.

Where the user selects to commence or complete a transaction, the present disclosure promotes one-click purchasing since much of the necessary information, such as customer name, address, credit card information, may already be available and may be automatically populated.

In the event the user selects to purchase the item, according to one embodiment, the user may select to purchase the item as a gift for someone in the user's social circle. The present disclosure allows the user to determine whether the gift is appropriate or likely to be desired by the person for whom the gift is being purchased. Other information, such as delivery address and other information for the recipient may also be readily accessed and provided using the present systems.

In one embodiment, the user may be shown the display illustrated in FIG. 5 in response to the user acting on the indication of a metatag 112. In this case, the window 504 may remain blank until a user makes a selection on the contextual menu 304. When the multimedia content 106 is not a video presentation, the scaled window 502 may optionally be removed or otherwise adjusted in accordance with the type of multimedia content 106 being played back.

As described above, the metatags 112 are inserted into the multimedia content 106 and displayed on a customer device 114 in accordance with one or a combination of the response provided by the multimedia content, products or other items of interest featured during the response period, and customer data. In one embodiment, a customer's location may also be used in the selection and display of metatags 112.

A customer's location may be determined from a variety of sources. For example, if the customer device 114 is a stationary device, then the customer's location may be determined based on a billing address or a home address stored in the customer data 110. If the customer device 114 is a mobile device, then the customer's location may be determined through communication with the location service 126, such as a geographical positioning system (GPS), or using any other similar technology to locate on the customer device 114. Any other techniques known to those skilled in the art for determining a location of a customer device 114 may also be used.

The location information may be used to determine the content of the metatags 112 that will be inserted into the multimedia content 106 and used by the customer device 114. Information in the contextual menu 304 may be used differently depending on the location of the customer device 114. For example, a customer in a first location may request a test drive, wherein the form shown in FIG. 5 may be communicated to the closest car dealership from the first customer's location for scheduling a test drive. A customer in a second location may view and manipulate all of the same information, but have the form shown in FIG. 5 communicated to a different dealership that is closest to the location of the second customer.

Also, the information displayed when navigating the contextual menu 304 or any sub-menus or additional windows associated with the contextual menu 304 may be different depending on a customer's location. For example, a product may not be offered in a region corresponding with a customer's location. In this case, some of the options for interacting with or having a transaction with the product may not be displayed on the contextual menu 304. Other options for requesting more information or requesting the product be offered in the region may still be available. Alternatively, the indication of a metatag 112 shown in FIG. 2 may not be displayed. In one embodiment, a metatag 112 corresponding to a product not offered in a region corresponding with a customer's location is not inserted into the multimedia content 106. In another embodiment, the metatags 112 may be filtered from use at the customer device 114. If several products are featured in a scene, then any of the products not offered in a region may not be included in a product list or may not have an indication similar to those shown in FIG. 4.

According to one embodiment, the user may allow or agree to receive or act on triggers, such as receiving or acting on a certain number of triggers per video or movie, or per period of time, in exchange for free or reduced rates on content. For example, a game might be free to play or download with more triggers than other versions of the same game. As another example, the user might receive discounted monthly service for movie downloads in exchange for the user acting on a certain number of triggers per movie or over a number of movies.

Figure 6:
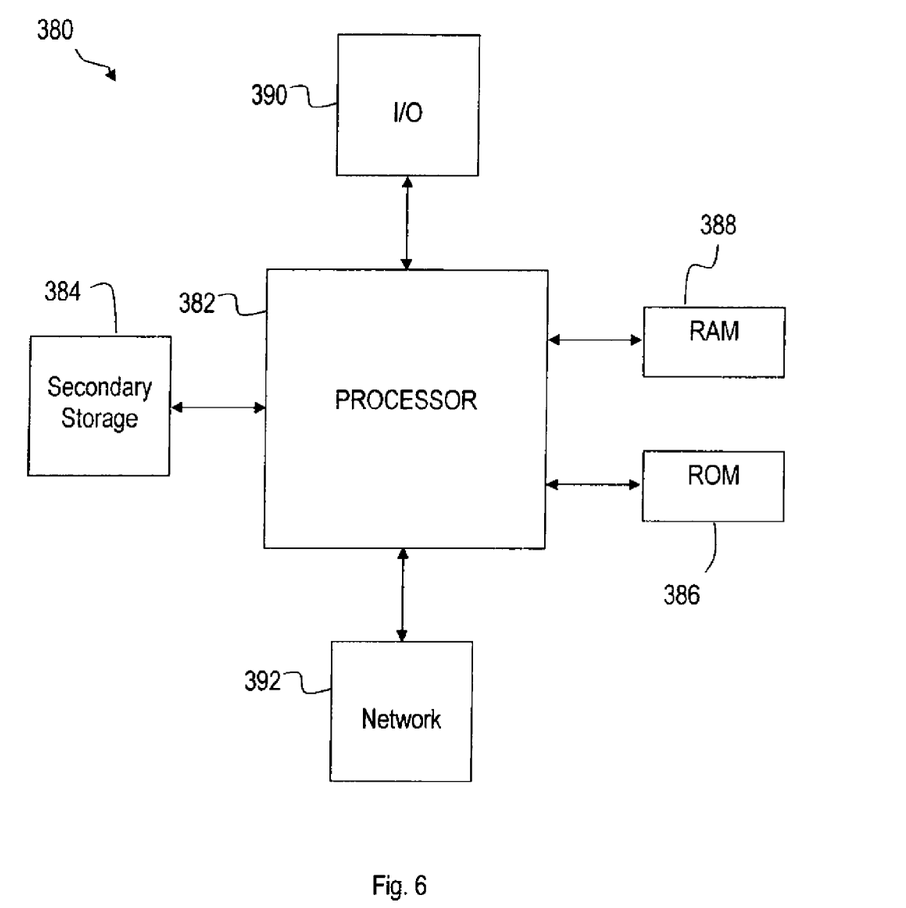
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices such as 802.16 compliant WIMAX based systems. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for metatagging multimedia content being delivered to a customer device, comprising:
   receiving multimedia content comprising at least one response range during which at least one product or item of interest is featured in the multimedia content;
   receiving a list of products or items of interest that are featured during the at least one response range in the multimedia content, wherein the list includes the at least one product or item of interest;
   selecting at least one metatag associated with the at least one product or item of interest on the list to correlate with the at least one response range based on customer data of a customer;
   inserting the at least one metatag into the multimedia content at the at least one response range;
   providing the multimedia content with the at least one metatag to the customer subsequent to the receiving the list, the selecting the at least one metatag, and the inserting the at least one metatag;

indicating the presence of the at least one metatag within the multimedia content upon reaching the at least one response range; and presenting at least one of a plurality of options including at least one of an option to provide information about the at least one product or item of interest featured during the at least one response range, an option to interact with the at least one product or item of interest featured during the at least one response range, and an option to enable a transaction with the at least one product or item of interest featured during the at least one response range, wherein presenting the at least one of the plurality of options is based on the customer data and the at least one product or item of interest featured during the at least one response range.

2. The method of claim 1, wherein the customer data comprises information derived from the customer's social circle, wherein the customer's social circle includes a set of contacts with whom the customer communicates with using the customer device.

3. The method of claim 1, wherein the at least one product or item of interest includes featured during the at least one response range comprises at least one of a commercially available product, a commercially available service, an actor, a location, and a landmark.

4. The method of claim 1, wherein the indication is provided during a period of the playback of the multimedia content.

5. The method of claim 4, wherein the period is during when the at least one product or item of interest is featured in the multimedia content and/or when the response is provided by the multimedia content.

6. The method of claim 1, further comprising:
playing back the multimedia content; and
halting, by a user, the playback of the multimedia content, wherein the indication is provided in response to the multimedia content being halted.

7. The method of claim 6, wherein the indication includes a plurality of indicators corresponding to each of a plurality of products or items of interest featured in the multimedia playback when the playback was halted.

8. The method of claim 1, where the options are provided in response to acting on the indication.

9. The method of claim 1, further comprising:
providing information corresponding to the selected option.

10. A multimedia distribution system comprising:
a multimedia distributor in communication with a multimedia producer and configured to receive the multimedia content produced by the multimedia producer, the multimedia content comprising at least one response range during which at least one product or item of interest is featured in the multimedia content, the multimedia distributor further configured to receive a list of products or items of interest that are featured during the at least one response range in the multimedia content, the list comprising the at least one product or item of interest, and the multimedia distributor further configured to select at least one metatag associated with the at least one product or item of interest on the list to correlate with the at least one response range based on customer data of a customer and encode the multimedia content with the at least one metatag at the at least one response range, wherein customer data includes a customer profile and a customer location; and a customer device in communication with the multimedia distributor and configured to present the multimedia content to the customer and provide the customer with at least one of a plurality of options for the customer to obtain additional information about the at least one product or item of interest featured during the at least one response range that is a subject of the at least one metatag, the at least one of the plurality of options including at least one of an option to provide information about the at least one product or item of interest, an option to interact with the at least one product or item of interest, and an option to enable a transaction with the at least one product or item of interest, wherein execution of the at least one of the plurality of options provided is based on the customer data.

11. The system of claim 10, wherein the customer data further includes a customer preferences.

12. The system of claim 11, wherein the media distributor uses information about the customer to determine which subjects in the multimedia content to provide metatags for, and further determines when in the multimedia content to indicate the presence of each of the metatags to the customer via the customer device.

13. The system of claim 12, wherein the multimedia distributor further determines a duration during which the multimedia content will provide the indication of the presence of each of the metatags to the customer.

14. The system of claim 10, wherein customer data includes at least one of data about a user interest, a user preference of a particular brand, a user viewing pattern, and prior selections of metatags.

15. The system of claim 10, wherein the customer data is collected from the customer device.

16. A method of providing multimedia content with metatags, comprising:
obtaining multimedia content comprising a response range during which materials are featured in the multimedia content;
obtaining a list of materials that are featured in the response range, wherein the list includes a first material and a second material, and wherein the first material and the second material include at least one of a product and a service;
determining a first customer data of a first customer;
selecting a first metatag associated with the first material on the list to correlate with the response range based on the first customer data;
inserting the first metatag into the multimedia content at the response range to promote the first material;
providing the multimedia content with the first metatag to the first customer subsequent to the selecting and the inserting of the first metatag;
determining a second customer data of a second customer;
selecting a second metatag associated with the second material on the list to correlate with the response range based on the second customer data;
inserting the second metatag into the multimedia content at the response range to promote the second material, the first and second metatags promoting different materials; and
providing the multimedia content with the second metatag to the second customer subsequent to the selecting and the inserting of the second metatag, wherein the multimedia content with the second metatag does not include the first metatag.

17. The method of claim 16, further comprising:
encoding the multimedia content with one of the first and second metatags while portions of the multimedia content is streaming to the first and second customers, respectively; and
wherein at least some of the first and second customer data is based on information related to the customer's mobile device usage.

18. The method of claim 16, further comprising:
providing one of the first and second customers with options to obtain additional information about the promoted material;
one of the first and second customers selecting to obtain additional information about the promoted material; and
providing the one of the first and second customers with the additional material.

19. The method of claim 16, wherein the multimedia content is provided to a device of the first and second customers selected from a group of devices consisting of: a portable telecommunications device, a cellular telephone, a digital telephone, a personal digital assistant (PDA), a personal computer, a laptop computer, a tablet computer, a set top box, a television, a gaming console, and a satellite radio device.

* * * * *